(12) United States Patent
Balasubramani et al.

(10) Patent No.: US 12,131,073 B2
(45) Date of Patent: Oct. 29, 2024

(54) END-TO-END QUALITY OF SERVICE MANAGEMENT FOR MEMORY DEVICE

(71) Applicant: MICRON TECHNOLOGY, INC., Boise, ID (US)

(72) Inventors: Muthazhagan Balasubramani, Singapore (SG); Woei Chen Peh, Singapore (SG)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/522,726

(22) Filed: Nov. 29, 2023

(65) Prior Publication Data

US 2024/0094958 A1    Mar. 21, 2024

Related U.S. Application Data

(63) Continuation of application No. 17/720,868, filed on Apr. 14, 2022, now Pat. No. 11,868,660.

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0613* (2013.01); *G06F 3/0635* (2013.01); *G06F 3/0679* (2013.01)

(58) Field of Classification Search
CPC .... G06F 3/0659; G06F 3/0604; G06F 3/0611; G06F 3/0613; G06F 3/0635; G06F 3/0673; G06F 3/0679; G06F 12/126; G06F 9/30079; G06F 9/38
See application file for complete search history.

(56) References Cited

U.S. PATENT DOCUMENTS

| 11,113,198 B2 | 9/2021 | Subbarao |
| 2004/0158695 A1* | 8/2004 | Ugen .................. G06F 9/30072 712/E9.05 |
| 2018/0024778 A1* | 1/2018 | Singh .................... G06F 3/0659 711/103 |

* cited by examiner

*Primary Examiner* — Shawn X Gu
(74) *Attorney, Agent, or Firm* — Lowenstein Sandler LLP (57) ABSTRACT

A set of submission queues associated with a host system is identified. A first set of internal queues and a second set of internal queues is generated based on the set of submission queues. Responsive to fetching a first memory access command pending in a submission queue of the set of submission queues, a first internal queue of the first set of internal queues is populated. Responsive to processing the first memory access command from the first internal queue of the first set of internal queues, a second internal queue of the second set of internal queues is populated. Responsive to completion of the first memory access command from the second internal queue of the second set of internal queues, an indication of the completion of the first memory access command is returned to the host system.

20 Claims, 6 Drawing Sheets

FIG. 1

| Queue ID(s) | Type(s) |
|---|---|
| Queue ID | Type |
| Queue ID | Type |
| Queue ID | Type |
| ... | ... |
| Queue ID | Type |

| Type(s) | Max Time(s) | Workload Type(s) |
|---|---|---|
| Type | Max Time | Workload Type |
| Type | Max Time | Workload Type |
| Type | Max Time | Workload Type |
| Type | Max Time | Workload Type |
| Type | Max Time | Workload Type |
| Type | Max Time | Workload Type |
| Type | Max Time | Workload Type |
| Type | Max Time | Workload Type |

```
┌─────────────────────────────────────────────────────────────────────┐
│ Responsive to identifying a request to create at least one submission queue on a host │
│ system, submit a first data structure to the host system, wherein the first data structure │
│ comprises an entry identification, a workload type, and a time quantum value. 510 │
└─────────────────────────────────────────────────────────────────────┘
                                    ↓
┌─────────────────────────────────────────────────────────────────────┐
│ Responsive to creation of the at least one submission queue by the host system, based │
│ on the first data structure, for each submission queue of the at least one submission │
│ queue, add an entry into a second data structure. │
│                                  520 │
└─────────────────────────────────────────────────────────────────────┘
```

END-TO-END QUALITY OF SERVICE MANAGEMENT FOR MEMORY DEVICE

RELATED APPLICATIONS

This application is a continuation U.S. patent application Ser. No. 17/720,868, filed Apr. 14, 2022, entitled "END-TO-END QUALITY OF SERVICE MANAGEMENT FOR MEMORY DEVICE", which is hereby incorporated in its entirely by reference herein.

TECHNICAL FIELD

Embodiments of the disclosure relate generally to memory sub-systems, and more specifically, relate to End-to-End (E2E) Quality of Service (QoS) Management for memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to E2E QoS management for the memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of a non-volatile memory device is a NAND memory device, such as 3D flash NAND memory, which offers storage in the form of compact, high density configurations. Other examples of non-volatile memory devices are described below in conjunction with FIG. 1. A non-volatile memory device is a package of one or more die. Each die can include one or more planes. For some types of non-volatile memory devices (e.g., NAND memory devices), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or a three-dimensional grid. The memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types.

Memory access commands, such as those sent by the host system, request the memory sub-system to perform memory access operations on the memory devices contained therein. Memory access commands can generally be classified into respective categories, such as read commands, write commands, erase commands, move commands, etc. A memory sub-system controller can receive the memory access commands from the host system connected externally to the memory sub-system, such as via a Non-Volatile Memory Express (NVMe) interface on a Peripheral Component Interconnect Express (PCIe) communication bus. The memory sub-system can execute the memory access commands to perform the memory access operations and can store the results of the memory access commands for retrieval by the host system after the memory sub-system reports completion of the execution of the memory access commands.

In certain implementations, the host system can utilize a set of queues to track the memory access commands issued to the memory sub-system. For example, the host system can maintain multiple submission queues, such that each submission queue stores a set of submission queue entries representing the memory access commands issued to the memory sub-system. Execution of the memory access commands typically includes a command fetch phase, a command processing phase, and a command completion phase returning the result to the host system. In order to provide quality of service management of the memory access commands, the host system can implement multiple submission queues, e.g. a high priority submission queue, a medium priority submission queue, and a low priority submission queue which would provide arbitration for memory access commands based on priority level. Thus, the memory sub-system receives memory access commands from the host system via the multiple submission queues based on their priority level. For example, the memory access commands that are queued in the high priority submission queue would be processed before the memory access commands that are queued in the medium or low priority submission queue. However, once the memory access command is fetched from the host system, the memory sub-system does not guarantee processing the memory access commands according to their respective priorities. Thus, the memory sub-system does not take full advantage of the QoS management scheme of the host system.

Aspects of the present disclosure address the above and other deficiencies by providing performance metrics associated possible workloads in order to create submission queues. In one embodiment, the host system may provide a memory sub-system identifiers, types, and/or other parameters of the submission queues thus causing the memory sub-system to create internal queues representative of the host submission queues. The internal queues are inserted between command processing phases of the memory sub-system and thus facilitate QoS management of memory access commands received from the host.

Advantages of this approach include but are not limited to, improved performance based on the latency of workloads and extending QoS management from a host system through to a memory sub-system.

Figure 1:
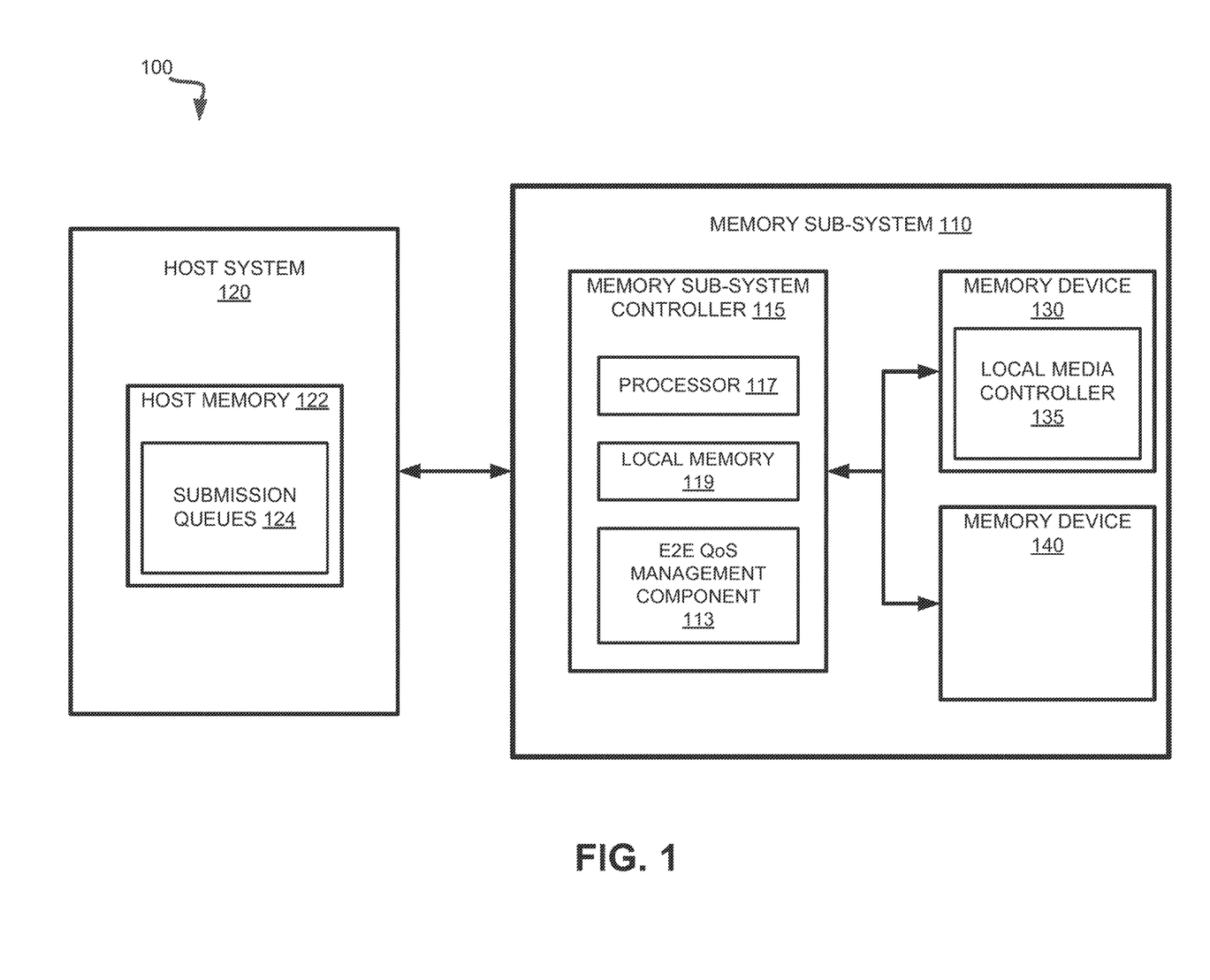
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells, such as memory array 137. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controller 132 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 132) for media management within the same memory device package. An example of a managed memory device is a managed NAND (MNAND) device.

In one embodiment, the memory sub-system 110 includes E2E QoS management component 113. In some embodiments, the memory sub-system controller 115 includes at least a portion of the E2E QoS management component 113. For example, the memory sub-system controller 115 can include a processor 117 (processing device) configured to execute instructions stored in local memory 119 for performing the operations described herein. In one embodiment, E2E QoS management component 113 performs end-to-end QoS management of memory access command from command fetch to command completion.

In one embodiment, the host system 120 may receive from the memory sub-system controller 115 a workload performance table including a plurality of entries, such that each entry is identified by a unique identifier (e.g., a workload type). Each entry includes a workload type (e.g., 1 MB sequential read, 128 KB sequential write, 4 KB random read, 4 KB random write, etc.) and the maximum completion time (e.g., 100 ms, 50 ms, 100 µs, 50 µs, etc.) (i.e., the maximum time to complete processing of the corresponding workload type). For example, the workload performance type may be sequential read, sequential write, random read, or random write. Depending on the embodiment, the memory sub-system controller 115 may generate the workload performance table by generating all possible workloads (e.g., sequential write of a specific data size) that can be performed on the memory device 130 and/or 140. The memory sub-system controller 115, based on various aspects of the memory sub-system 110 (e.g., CPU frequency, DRAM size, cache size, etc.) may calculate the time quantum value (e.g., the maximum time to execute the workload or max time) that is provided in the workload performance table. In some embodiments, the time quantum value is predefined based on manufacturing specification. In some embodiments, the time quantum value is determined based on testing of the workload.

The host system 120, based on the received workload performance table, creates one or more submission queues identified by the maximum completion time and corresponding workload type associated with a workload performance type. In some embodiments, the host system 120 may create multiple submission queues for the same maximum completion time and corresponding workload type associated with a workload performance type. For example, at least two submission queues may be created for a single maximum completion time and corresponding workload type associated with the workload performance type. Based on the creation of the submission queues by the host system 120, E2E QoS management component 113 may generate one or more internal queues to be inserted between phases of the execution of memory access commands. For example, fetch-processing internal queues may be generated and inserted between the command fetch phase and the command processing phase. The processing-completion internal queues may be generated and inserted between the command processing phase and the command completion phase. In some embodiments, the host system 120 may provide an indication of the creation of the one or more submission queues to the E2E QoS management component 113 to generate an arbitration table used to assist in further arbitration of the one or more internal queues based on priority. In particular, the arbitration table is a data structure that maintains a correlation between the submission queues and the workload type associated with the workload performance type. The E2E QoS management component 113 may fetch, during the command fetch phase, each memory access command from the host system 120 by identifying according to the arbitration table the max time associated with the queue from the submission queues. In particular, E2E QoS management component 113 fetches memory access commands from the submission queues of the host system 120 to be processed in the command fetch phase, then populates the fetch-processing internal queue by identifying according to the arbitration table the max time associated with the queue from the submission queues. The E2E QoS management component 113 may fetch each memory access command from the fetch-processing internal queue during the command processing phase based on the arbitration table provided by the host system 120. The E2E QoS management component 113 may, upon completion of the command processing phase, populate the processing-completion internal queue based on the arbitration table provided by the host system. Accordingly, E2E QoS management component 113 fetches, during the command completion phase, each memory access command from the processing-completion internal queue to be processed during the command completion phase. The E2E QoS management component 113 may, upon completion of the command processing phase, returns the executed memory access command to the host system 120. Further details regarding the operations of E2E QoS management component 113 are described below.

Figure 2A:
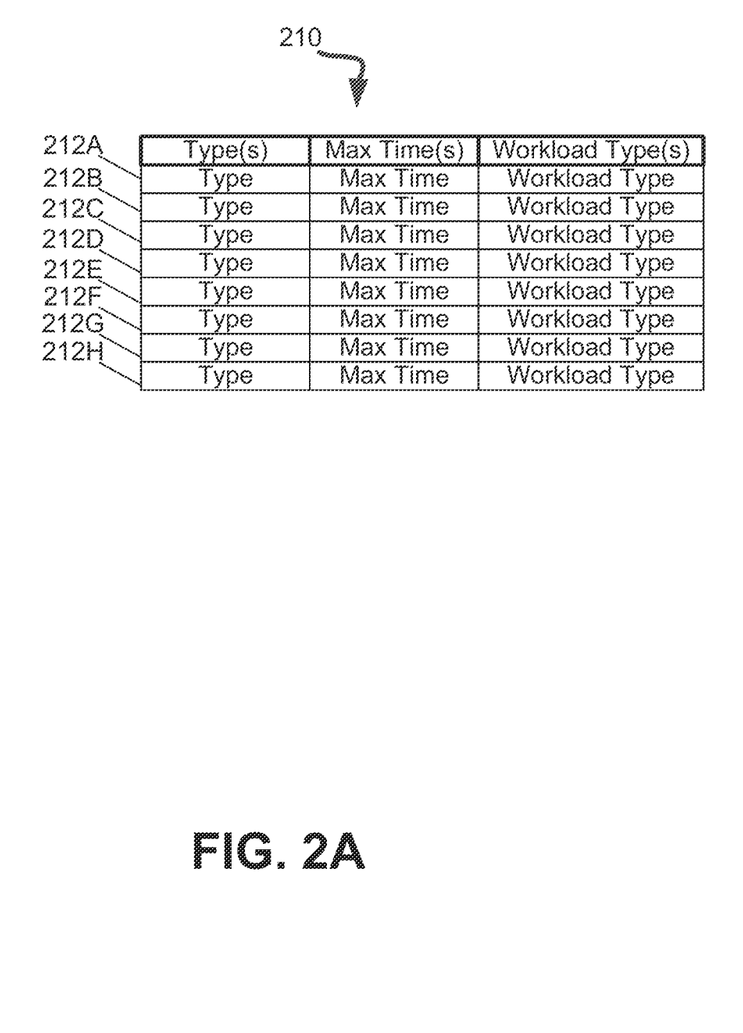
FIG. 2A is an exemplary chart of a workload performance table of the memory sub-system in accordance with some embodiments of the present disclosure.

FIG. 2A illustrates an exemplary chart of a workload performance table (e.g., workload performance table 210) in accordance with some embodiments of the present disclosure. As described previously, the workload performance table can be created by the controller of the memory sub-system (e.g., memory sub-system 110). The host system (e.g., host system 120 of FIG. 1) may receive from the memory sub-system the workload performance table 210. The workload performance table (WP table) 210 may be stored in local memory 119, memory device 130 and/or 140 (FIG. 1). The WP table includes a plurality of entries (e.g., 212A-H). Each entry of the plurality of entries comprises a type, a max time, and a workload type. The type (e.g., unique identifier) associated with an entry (e.g., entry 212A) indicates an identification number for the entry in the workload performance table 210. The workload type associated with the entry (e.g., 212A) indicates a type of memory access commands, such as sequential read, sequential write, random read, random write, etc. The workload type may indicate the data size and the type of memory access command, for example, 1 MB sequential read, 128 KB sequential write, 4 KB random read, 4 KB random write, etc. The max time associated with the entry (e.g., 212A) indicates the maximum time for processing the workload (i.e., the worst-case completion time for the memory access command) (e.g., 1 MB sequential read). In some embodiments, based on the WP table 210, the host system may create at least one submission queue for each entry of the WP table 210 (e.g., 212A-H). In some embodiments, the host system may create multiple submission queues for one or more entries of the WP table 210 (e.g., 212A-H). Once the host system creates the submission queues according to the WP table 210, the E2E QoS management component (of FIG. 1) may generate an arbitration table to be stored in local memory 119, memory device 130 and/or 140 (FIG. 1).

Figure 2B:
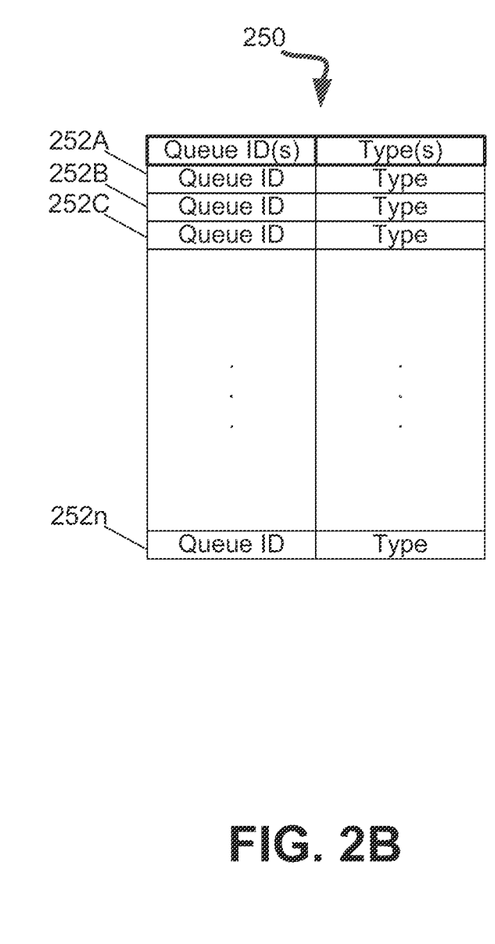
FIG. 2B is an exemplary chart of an arbitration table of E2E QoS management for the memory sub-system in accordance with some embodiment of the present disclosure.

FIG. 2B illustrates an exemplary chart of an arbitration table (e.g., arbitration table 250) in accordance with some embodiments of the present disclosure. The E2E QoS management component (e.g., E2E QoS management component 113 of FIG. 1) may receive a notification from the host system for each submission queue generated. Each notification from the host system comprises a unique identifier associated with the submission queue (e.g., queue ID) and a type associated with the submission queue. The E2E QoS management component may populate each entry (e.g., 252A-n) of the arbitration table 250 with information associated with each notification (e.g., the queue ID and type). In some embodiments, the E2E QoS management component may access the WP table 210 (FIG. 2A) to obtain a max time associated with the type rather than utilizing the type to query the WP table 210. Accordingly, the arbitration table may contain all data associated with the queue ID and max time for QoS management based on max time. In some embodiments, due to the host system creating multiple queues for one or more entries of the WP table 210, the arbitration table 250 may include multiple entries (e.g., 252A-n) with different queue ID(s) having similar types.

Figure 3:
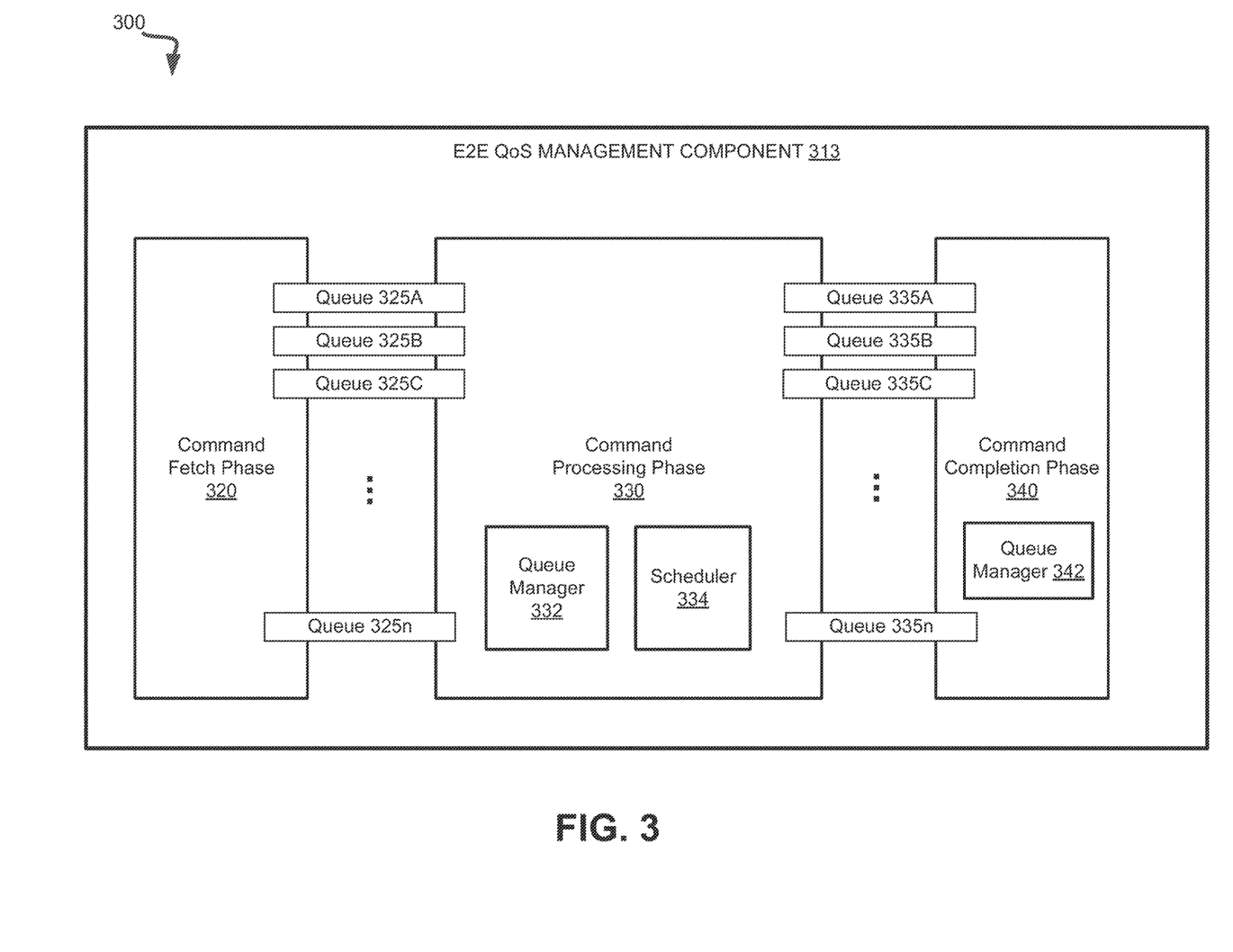
FIG. 3 illustrates an example of E2E QoS management for the memory sub-system in accordance with some embodiments of the present disclosure.

FIG. 3 illustrates an example of the E2E QoS management for the memory sub-system in accordance with some embodiments of the present disclosure. The E2E QoS management 313 (similar to E2E QoS management 113 of FIG. 1) includes a command fetch phase 320, a plurality of queues 325A-N, a command processing phase 330, a plurality of queues 335A-n, and a command completion phase 340. The plurality of queues 325A-n may be positioned between the fetch phase 320 and the processing phase 330. The plurality of queues 335A-n may be positioned between the processing phase 330 and the completion phase 340. Depending on the embodiment, the plurality of queues 335A-n and the plurality of queues 325A-n may be first-in-first-out (FIFO) queues.

The host system (e.g., host system 120 of FIG. 1) may submit one or more memory access commands to one or more of the submission queues and alert the E2E QoS management 313. In some embodiments, the host system alerts the E2E QoS management 313 via a doorbell module of the fetch phase 320. The doorbell module of the fetch phase 320 refers to an alert triggered by the host system and constantly monitored by the fetch phase 320. Depending on the embodiment, if there is only one memory access command, the fetch phase 320 may retrieve the memory access command from the appropriate submission queue and process the memory access command from the fetch phase 320 through to the completion phase 340 and return to the host system.

In some embodiments, multiple submission queues contain multiple memory access commands. Accordingly, the fetch phase 320 may arbitrate the submission queues of the host systems according to an arbitration scheme (e.g., a method of memory access selection) based on the arbitration table (e.g., arbitration table 250 of FIG. 2). In some embodiments, the arbitration scheme may prioritize the submission queues associated with the shortest max time over the submission queues associated with the highest max time. In some embodiments, the arbitration scheme may identify the submission queue with the highest max time. Based on the submission queue with the highest max time, the arbitration scheme may determine a number of memory access commands to retrieve from each of the remaining submission queues by dividing the largest max time by the max time of the corresponding submission queue. In particular, starting with the submission queue with the lowest (e.g., smallest) max time, a set number of memory access commands is determined to be retrieved from the submission queue by dividing the largest max time by the lowest max time.

The fetch phase 320 fetches each memory access command based on the arbitration scheme, the arbitration table, and the WP table. Once a memory access command is fetched from a submission queue of the host system, the fetch phase 320 parses the memory access command and assigns a tag. In some embodiments, parsing the memory access command may include validating the memory access command. The tag indicates the state (e.g., new, idle, execute, pending, abort, complete, etc.) of the memory access command. In some embodiments, once the memory access command is parsed, the fetch phase 320 assigns a "new" tag. The fetch phase 320 may populate the plurality of queues 325A-n based on the submission queue the memory access commands that were fetched from using the queue ID of the submission queue.

The processing phase 330 may include a queue manager 332 and a scheduler 334 (or scheduler 334) to identify new entries in the plurality of queues 325A-n. The queue manager 332 fetches memory access commands from the plurality of queues 325A-n based on the arbitration scheme and arbitration table. In some embodiments, the scheduler 334 may start a timer based on when the memory access command is fetched by the queue manager 332. Once the queue manager 332 fetches a memory access command from the plurality of queues 325A-n, the scheduler 334 may change the "new" tag to an "execute" tag. Depending on the embodiment, the scheduler 334 may begin processing the memory access commands.

Processing the memory access commands may include submitting the memory access commands to one or more stages of the processing phase 330 to be executed and performing memory access operations associated with the memory access commands. The stages of the processing phase 330 may include command handler, flash translation layer (FTL), and a memory device (e.g., non-volatile memory device). In some embodiments, the command handler receives the memory access command to identify the memory access operation to be performed at a logical address and returns metadata associated with the memory access operation and logical address. The FTL translates the received logical address into a corresponding physical address and returns the physical address identifying the memory device location with respect to which the memory access operation is to be performed. The memory device receives the memory access operation and the physical address to perform the memory access operation and performs the memory access operation at the physical address.

Between stages of the processing phase 330, the scheduler 334 determines whether to proceed with a subsequent stage or change the "execute" tag to a "pending" tag for later processing to process higher priority memory access commands. In some embodiments, to determine whether to change the "execute" tag to the "pending" tag to process higher priority memory access commands, the scheduler 334 determines whether there is a new memory access command to be fetched from a queue of the plurality of queues 325A-n with a higher priority (e.g., a queue of the plurality of queues 325A-n with a lower max time). In some embodiments, the scheduler 334 can change the "execute" tag to the "pending" tag to process higher priority memory access commands responsive to determining that the duration of time between the start of the timer and a current time of a pending memory access command (e.g., during the processing phase 330) is equal to or exceeds the max time associated with the queue of the plurality of queues that the memory access commands was fetched. In some embodiments, the scheduler 334 can change the "execute" tag to the "pending" tag to process the higher priority memory access commands responsive to determining that a new memory access command can be fetched from a queue of the plurality of queues 325A-n with a higher priority or responsive to determining that the duration of time between the start of the timer and a current time of a pending memory access command (e.g., during the processing phase 330) is equal to or exceeds the max time associated with the queue of the plurality of queues that the memory access commands was fetched.

Once a memory access command has been successfully processed through one or more stages of the processing phase 330, the queue manager 332 may change the "execute" tag to a "complete" tag. The processing phase 330 may identify completed memory access commands (e.g., assigned a "complete" tag) and populate the plurality of queues 335A-n based on the submission queue the memory access commands were fetched from by using the queue ID of the submission queue. In some embodiments, the queue manager 332 may identify completed memory access commands (e.g., assigned a "complete" tag) and populate the plurality of queues 335A-n based on the submission queue the memory access commands was fetched from by using the queue ID of the submission queue.

In some embodiments, an exception (e.g., a failure) associated with the memory access command may occur during the processing phase 330. Responsive to receiving the exception, the scheduler 334 may change the "execute" tag associated with the memory access command to a "recover" tag. The processing phase 330 may attempt to recover the memory access command. If the processing phase 330 successfully recovers the memory access command, the scheduler 334 may change the "recover" tag back to the "execute" tag. If the processing phase 330 fails to recover the memory access command, the scheduler 334 may change the "recover" tag to an "abort" tag. The processing phase 330, based on the "abort" tag, will notify the host system that an exception and/or failure associated with the memory access command has occurred and cause the scheduler 334 to change the "abort" tag to the "complete" tag.

The completion phase 340 may fetch memory access commands from the plurality of queues 335A-n based on the arbitration scheme and the arbitration table. In some embodiments, the completion phase 340 may include a queue manager 342 to fetch memory access commands from the plurality of queues 335A-n based on the arbitration scheme and the arbitration table. The completion phase 340 may signal an interrupt to the host system to send the memory access command to the host system.

Figure 4:
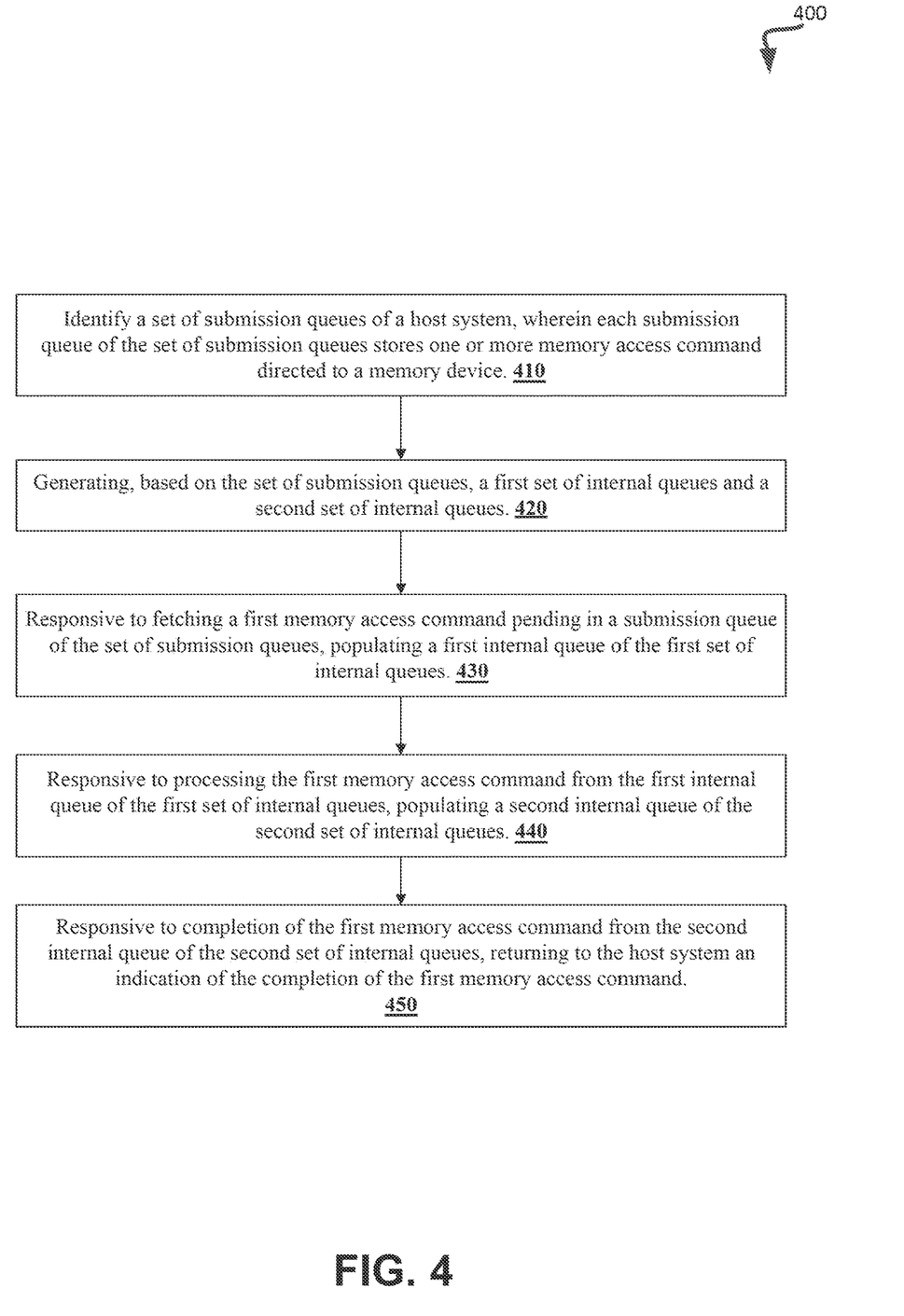
FIG. 4 is a flow diagram of an example method of performing E2E QoS management of the memory sub-system in accordance with some embodiments of the present disclosure.

FIG. 4 is a flow diagram of an example method 400 to perform E2E QoS management of the memory sub-system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by E2E QoS management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic identifies a set of submission queues of a host system. Each submission queue of the set of submission queues stores one or more memory access command directed to a memory device. Each submission queue may be created based on a respective entry of the first data structure including an entry identification, a workload type, and a time quantum value. The time quantum value may be a maximum time to execute the workload type. As described previously, the first data structure may be created by the controller of the memory sub-system. The host system may receive from the memory sub-system the first data structure. The entry identification (e.g., type) refers to an entry of the first data structure indicating an identification number for the entry in the first data structure. The workload type associated with the entry of the first data structure indicates a type of memory access command, such as sequential read, sequential write, random read, random write, etc. The workload type may indicate the data size and the type of memory access command, for example, 1 MB sequential read, 128 KB sequential write, 4 KB random read, 4 KB random write, etc.

At operation 420, the processing logic generates, based on the set of submission queues, a first set of internal queues and a second set of internal queues. To generate the first set of internal queues and the second set of internal queues, the processing logic creates an internal queue of the first set of internal queues and an internal queue of the second set of internal queues for each submission queue of the submission queues. Each of the internal queues of the first set of internal queues and second set of internal queues is associated with the entry identification, the workload type, and the time quantum value of the corresponding submission queue of the submission queues. As described previously, based on the creation of the submission queues by the host system, the processing logic generate one or more internal queues to be inserted between the command processing phase and command completion phase of an execution of the memory access command.

At operation 430, responsive to fetching a first memory access command pending in a submission queue of the set of submission queues, the processing logic populates an internal queue of the first set of internal queues. To fetch the first memory access command pending in the submission queue of the set of submission queues, the processing logic determines the submission queue of the set of submission queues to fetch the first memory access command based on the time quantum value associated with the submission queue. As described previously, to execute the memory access command, each memory access command may be processed in one or more phases (e.g., a command fetch phase, a command processing phase, and a command completion phase). Accordingly, the first set of internal queues may be positioned between the command fetch phase and the command processing phase and the second set of internal queues may be positioned between the processing phase and the completion phase.

At operation 440, responsive to processing the first memory access command from the internal queue of the first set of internal queues, the processing logic populates a second internal queue of the second set of internal queues. In some embodiments, while processing the first memory access command from the first internal queue of the first set of internal queues, the processing logic may modify, based on a presence of a second memory access command in an internal queue of the first set of internal queues, a processing state of the first memory access command.

In some embodiments, to modify the processing state of the first memory access command, the processing logic determines that the second memory access command has a higher priority than the first memory access command and updates the processing state of the first memory access command from an execute state to a pending state and the processing state of the second memory access command to an execute state. As described previously, between the one or more phases, the processing logic determines whether to proceed with a subsequent phase to process the memory access command (e.g., the first access command) or change the memory access command to pending for later processing to process higher priority memory access commands (e.g., the second access command).

In some embodiments, to modify the processing state of the first memory access command, the processing logic determines that the second memory access command has remained in an internal queue of the first set of internal queues for at least a time quantum value associated with the internal queue of the first set of internal queues, updates the processing state of the first memory access command from an execute state to a pending state, and updates the processing state of the second memory access command to an execute state. As described previously, a timer is initiated once a respective memory access command is fetched from the first set of internal queues. The processing logic, based on a duration from the start of the timer of the memory access command (e.g., the second memory access command) to the current time is equal to or exceeds the time quantum value associated with the internal queue of the first set of internal queues that the second memory access commands was fetched.

At operation 450, responsive to completion of the first memory access command from the second internal queue of the second set of internal queues, the processing logic returns to the host system an indication of completion of the first memory access command. As described previously, the processing logic may signal an interrupt to the host system to send the first memory access command to the host system.

Figure 5:
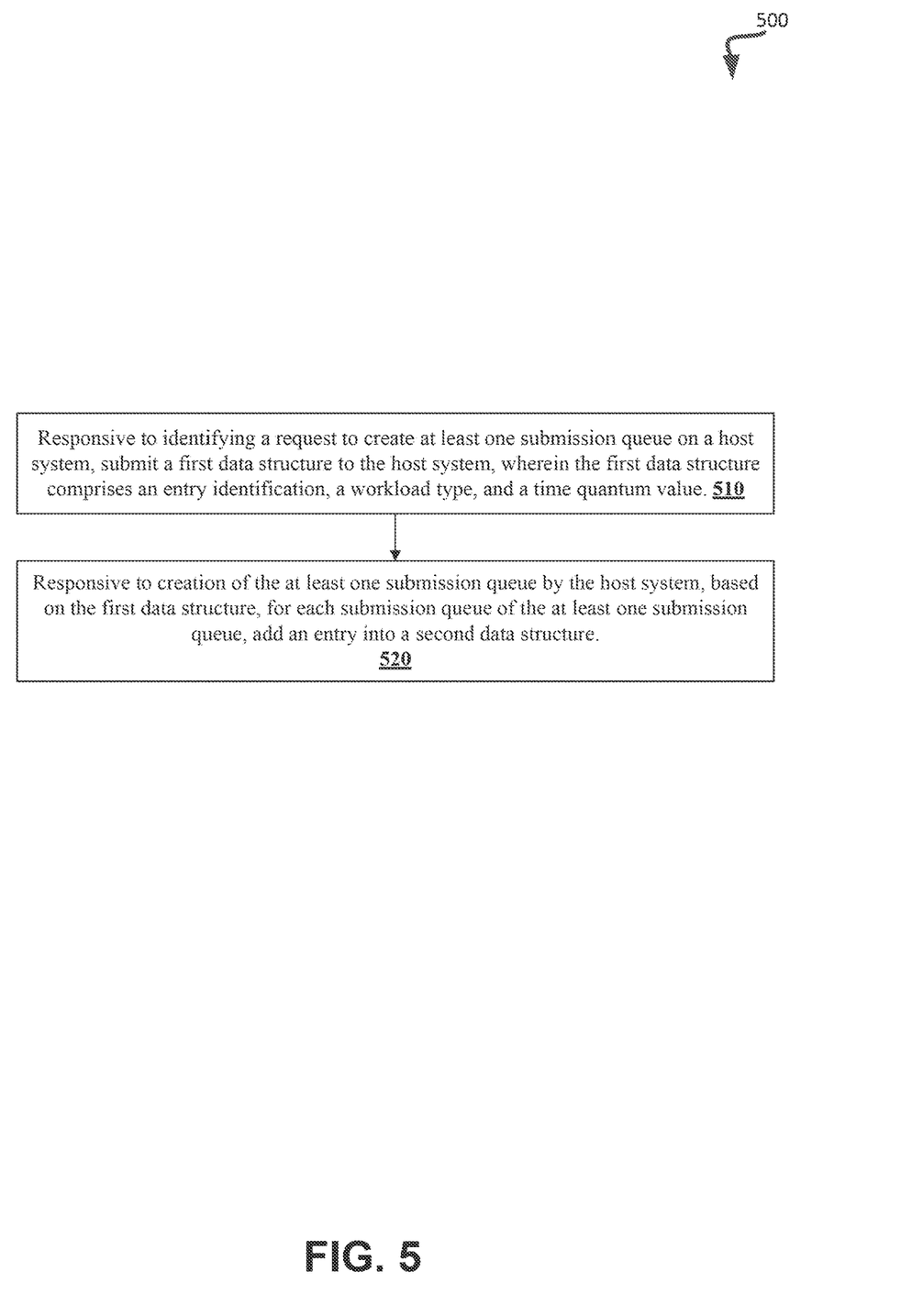
FIG. 5 is a flow diagram of an example method of performing E2E QoS management of the memory sub-system in accordance with some embodiments of the present disclosure.

FIG. 5 is a flow diagram of an example method 500 to perform E2E QoS management of the memory sub-system in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by E2E QoS management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, responsive to identifying a request to create at least one submission queue on a host system, the processing logic submits a first data structure to the host system. The first data structure includes a plurality of entries each entry includes an entry identification, a workload type, and a time quantum value. The type (e.g., entry identification) associated with a respective entry indicates an identification number for the entry in the first data structure. The workload type associated with the entry indicates a type of memory access command, such as sequential read, sequential write, random read, random write, etc. The workload type may indicate the data size and the type of memory access command. The max time (e.g., time quantum value) associated with the entry indicates a maximum duration of time it would take to complete the workload (i.e., the worst-case completion time for the memory access command).

At operation 520, responsive to the creation of the at least one submission queue by the host system, the processing logic, based on the first data structure, for each submission queue of the at least one submission queue, adds an entry into a second data structure. Each entry of the second data structure includes an identification of a respective submission queue of the at least one submission queue and the entry identification of the first data structure associated with the respective submission queue. As described previously, for each submission queue created, the processing logic may populate each entry of the second data structure (e.g., arbitration table) with information associated with the first data structure. In some embodiments, the processing logic generates, based on the at least one submission queue, at least one first internal queue and at least one second internal queue.

In some embodiments, responsive to fetching a first memory access command pending in a submission queue of the at least one submission queue, the processing logic populates a first internal queue of the at least one first internal queues. Responsive to processing the first memory access command from the first internal queue, the processing logic populates a second internal queue of the at least one second internal queue. Responsive to the completion of the first memory access command from the second internal queue, the processing logic returns to the host system an indication of the completion of the first memory access command.

Figure 6:
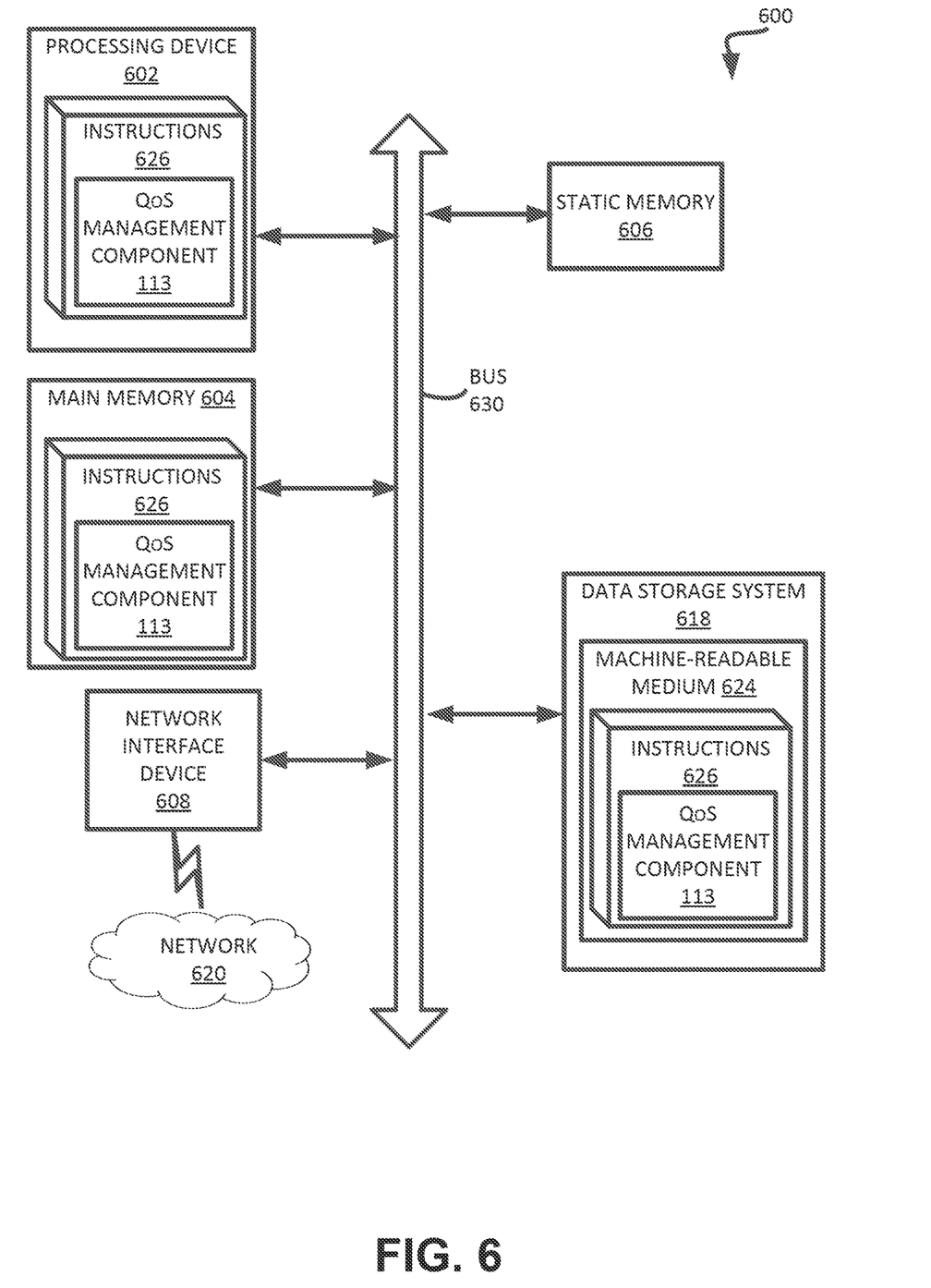
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the E2E QoS management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to E2E QoS management component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   prioritizing, by a processing device, a submission queue of a set of submission queues associated with a host system;
   fetching, from the submission queue, a first memory access command, wherein the fetched first memory access command is assigned a tag;
   changing, during a first phase of an execution of the first memory access command, the tag;
   populating the first memory access command in a queue of a plurality of first queues positioned between the first phase and a second phase of the execution of the first memory access command; and
   returning to the host system an indication of completion of the first memory access command.

2. The method of claim 1, wherein prioritizing the submission queue comprises selecting, from the set of submission queues, the submission queue with the shortest max time.

3. The method of claim 1, wherein the tag indicates a state of the first memory access command, and wherein the tag is one of: a new state, an idle state, an execute state, a pending state, an abort state, or a complete state.

4. The method of claim 1, wherein changing, during the first phase of an execution of the first memory access command, the tag comprises changing the tag from a new state to an execute state.

5. The method of claim 1, further comprising:
   changing, during the second phase of the execution of the first memory access command, the tag from an execute state to a complete state; and
   in response to changing the tag, populating the first memory access command in a queue of a plurality of second queues positioned between the second phase and a third phase of the execution of the first memory access command.

6. The method of claim 5, wherein the queue of the plurality of second queues is populated using a queue ID of the submission queue.

7. The method of claim 1, wherein the queue of the plurality of first queues is populated using a queue ID of the submission queue.

8. A system comprising:
a memory device; and
a processing device, operatively coupled with the memory device, to perform operations comprising:
   prioritizing, by the processing device, a submission queue of a set of submission queues associated with a host system;
   fetching, from the submission queue, a first memory access command, wherein the fetched first memory access command is assigned a tag;
   changing, during a first phase of an execution of the first memory access command, the tag;
   populating the first memory access command in a queue of a plurality of first queues positioned between the first phase and a second phase of the execution of the first memory access command; and
   returning to the host system an indication of completion of the first memory access command.

9. The system of claim 8, wherein prioritizing the submission queue comprises selecting, from the set of submission queues, the submission queue with the shortest max time.

10. The system of claim 8, wherein the tag indicates a state of the first memory access command, and wherein the tag is one of: a new state, an idle state, an execute state, a pending state, an abort state, or a complete state.

11. The system of claim 8, wherein changing, during the first phase of an execution of the first memory access command, the tag comprises changing the tag from a new state to an execute state.

12. The system of claim 8, wherein the processing device is to perform operations further comprising:
   changing, during the second phase of the execution of the first memory access command, the tag from an execute state to a complete state; and
   in response to changing the tag, populating the first memory access command in a queue of a plurality of second queues positioned between the second phase and a third phase of the execution of the first memory access command.

13. The system of claim 12, wherein the queue of the plurality of second queues is populated using a queue ID of the submission queue.

14. The system of claim 8, wherein the queue of the plurality of first queues is populated using a queue ID of the submission queue.

15. A non-transitory computer-readable storage medium comprising instructions that, when executed by a processing device, cause the processing device to perform operations comprising:
   prioritizing, by the processing device, a submission queue of a set of submission queues associated with a host system;
   fetching, from the submission queue, a first memory access command, wherein the fetched first memory access command is assigned a tag;
   changing, during a first phase of an execution of the first memory access command, the tag;
   populating the first memory access command in a queue of a plurality of first queues positioned between the first phase and a second phase of the execution of the first memory access command; and
   returning to the host system an indication of completion of the first memory access command.

16. The non-transitory computer-readable storage medium of claim 15, wherein prioritizing the submission queue comprises selecting, from the set of submission queues, the submission queue with the shortest max time.

17. The non-transitory computer-readable storage medium of claim 15, wherein the tag indicates a state of the first memory access command, and wherein the tag is one of: a new state, an idle state, an execute state, a pending state, an abort state, or a complete state.

18. The non-transitory computer-readable storage medium of claim 15, wherein changing, during the first phase of an execution of the first memory access command, the tag comprises changing the tag from a new state to an execute state.

19. The non-transitory computer-readable storage medium of claim 15, wherein the processing device is caused to perform operations further comprising:
   changing, during the second phase of the execution of the first memory access command, the tag from an execute state to a complete state; and
   in response to changing the tag, populating the first memory access command in a queue of a plurality of second queues positioned between the second phase and a third phase of the execution of the first memory access command.

20. The non-transitory computer-readable storage medium of claim 19, wherein the queue of the plurality of first queues is populated using a queue ID of the submission queue and wherein the queue of the plurality of second queues is populated using a queue ID of the submission queue.

* * * * *